United States Patent [19]

Huignard

[11] Patent Number: 4,527,132

[45] Date of Patent: Jul. 2, 1985

[54] DEVICE FOR EVOLUTIVE ILLUMINATION OF AN OBJECT

[75] Inventor: Jean P. Huignard, Paris, France

[73] Assignee: Thomson CSF, Paris, France

[21] Appl. No.: 392,474

[22] Filed: Jun. 28, 1982

[30] Foreign Application Priority Data

Jun. 30, 1981 [FR] France ................ 81 12833

[51] Int. Cl.$^3$ .......................... H01S 3/10; H04N 5/30
[52] U.S. Cl. .................... 332/7.51; 330/4.3; 307/428; 350/359
[58] Field of Search ................. 330/4.3–4.5; 362/259; 350/359; 307/428, 425

[56] References Cited

U.S. PATENT DOCUMENTS

| | | | |
|---|---|---|---|
| 3,624,421 | 11/1974 | Pantell | 330/4.3 |
| 4,048,515 | 9/1977 | Liu | 372/22 |
| 4,220,928 | 9/1980 | Bloom | 330/4.3 |
| 4,390,991 | 6/1983 | Pierson | 372/21 |
| 4,442,455 | 4/1984 | Huignard et al. | 350/3.63 |

OTHER PUBLICATIONS

Applied Physics Letters, vol. 31, No. 9, pp. 592–594.
IBM Technical Disclosure Bulletin, vol. 22, No. 9, 1980, pp. 4173–4174.
Journal of the Optical Society of America, vol. 68, No. 11, 1978, pp. 1628–1629.
Journal of the Optical Society of America, vol. 70, No. 6, 1980, p. 599, ref. E.3.
Journal of the Optical Society of America, vol. 7, No. 6, 1980, 599–560, ref. E.4.
Optics Communications, vol. 32, No. 3, Mar. 1980, pp. 478–480.

*Primary Examiner*—Nelson Moskowitz
*Attorney, Agent, or Firm*—Cushman, Darby & Cushman

[57] ABSTRACT

A device is provided for the prolonged illumination of an object from an initial transitory illumination. This device comprises a laser whose cavity is closed by two total reflection mirrors; in the path of the intra-cavity radiation is disposed a photoexcitable interaction medium with index variation in the volume of which the transitory signal wave coming from the object and the intra-cavity radiation interfere; this interference generates in real time an index strata grating which diffracts a complex conjugate wave of the signal wave which returns to the object.

10 Claims, 2 Drawing Figures

# DEVICE FOR EVOLUTIVE ILLUMINATION OF AN OBJECT

BACKGROUND OF THE INVENTION

The invention relates to devices for illuminating objects, particularly to devices for efficiently illuminating a distant object for a prolonged length of time despite index unhomogeneities separating the illuminating device from the object.

To illuminate a distant object it is advantageous to use coherent optical radiation, emitted by a laser for example. But the propagation of a laser beam in the atmosphere is generally accompanied by considerable disturbance of the phase of the optical wave. These distortions are created by the presence, in the atmosphere, of random index gradients or by the passage through optical components presenting an unhomogeneous distribution of the refraction index. Thus, the presence of disturbances prevents a maximum of radiated energy from reaching the object to be illuminated.

To palliate these disadvantages, the illuminating device of the invention uses means for ensuring good concentration of radiated energy on an object to be illuminated for a prolonged period of time, from an initial transitory illumination, whatever the turbulences and disturbances in the atmosphere traversed.

This result is obtained by using, for constructing the illuminating device, the so-called four-wave mixing techniques. According to these techniques, by causing, in a photoexcitable optical medium with index variation, an incident wave with any wave front to interfere with a pump wave, there is generated in real time a conjugate wave of the incident wave, i.e. a wave which follows exactly the same path, in the reverse direction, as the incident wave and so undergoes the same deformations in a reverse direction.

SUMMARY OF THE INVENTION

According to the invention, such an interaction medium is placed inside a laser cavity closed by two total reflection mirrors. It is disposed in the path of the intracavity radiation which plays the role of pump wave. If the object emits towards the device a transitory signal wave, for example if it is illuminated by a light pulse, this signal wave interferes, in the volume of the photoexcitable medium, with the pump wave, i.e. the intracavity radiation of the laser, which results in generating a conjugate wave of the signal wave received by the medium.

This conjugate wave returns to the object while following the same path and undergoing the same deformations. It may then be reflected by the object and return to the illuminating device thus forming a new signal wave, which takes into account the new state of the atmosphere passed through. It again generates a conjugate wave and so on.

From a transitory signal wave emanating from the object, this device thus provides evolutive illumination of this object whatever the disturbances in the atmosphere and even if the object and the device are in relative motion. By "evolutive illumination" is meant in the present application the ability to undergo progressive transformations.

The invention relates precisely to a device for the evolutive illumination of an object by radiation from a laser whose cavity is closed by two mirrors, this object being capable of emitting a transitory signal wave, wherein said two mirrors are total reflection mirrors and the illumination radiation is emitted from the laser through a photoexcitable interaction medium with index variation disposed inside the laser cavity in the path of the intracavity radiation, this intra-cavity radiation interfering within this medium with the transitory signal wave emitted by the object so as to generate a complex conjugate wave from the signal wave, this conjugate wave returning to the object and, being again reflected thereby, forming a new signal wave.

BRIEF DESCRIPTION OF THE DRAWINGS

The invention will be better understood from the following description illustrated by the accompanying figures in which.

DESCRIPTION OF THE PREFERRED EMBODIMENT

The device of the invention uses the restitution of a conjugate wave front from an incident wave front of complex morphology. This restitution is generated by the interference, in a photoexcitable optical medium with index variation, of an incident optical wave with a pump wave.

Figure 1:
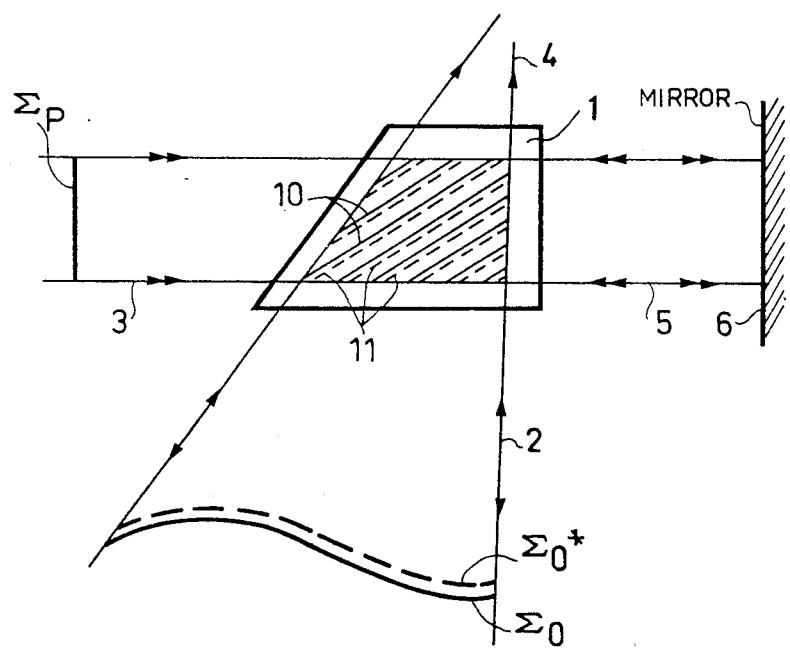
FIG. 1 is an explanatory figure of the operation of the index variation photoexcitable medium.

This interference occurs in a three-dimensional medium, shown schematically at 1 in FIG. 1, the physical characteristics and in particular the index of refraction of which are modulated in space by a fringe grating 10 produced by the interference of the incident optical wave 2 having any wave front $\Sigma_o$ and the pump wave 3, with wave front $\Sigma_p$, flat for example. Because of the existence of this spatial illumination modulation which induces a grating of index strata 11, a fraction of the energy of pump wave 3, or reference wave, is diffracted in the form of an emergent wave 4 having characteristics isomorphic with those of the incident wave.

Another fraction of the pump wave 3 passes through medium 1 and leaves as beam 5. By placing in its path, and normally thereto, a reflecting mirror 6, this wave 5 is reflected back into medium 1 and it forms a reading wave for the written diffraction grating. A part of its energy is diffracted by the strata grating 11 in the form of en emergent wave having a complex wave front $\Sigma_o^*$, conjugated from wave $\Sigma_o$. $\Sigma_o^*$ as characteristics isomorphic with those of $\Sigma_o$, but follows its path in the reverse direction, and undergoes the same deformations in the reverse direction.

The restitution of this wave $\Sigma_o^*$ occurs in real time, apart from the time required for the establishment of the strata grating. Depending on the materials forming medium 1, this time constant varies from $10^{-3}$ to $10^{-12}$ seconds.

It should also be noted that the energy of the restituted conjugate wave $\Sigma_o^*$ taken by the strata grating from the pump wave, or reading wave, may be not inconsiderable with respect to the energy of the incident wave $\Sigma_o$ arriving in medium 1, it may be possibly greater.

Numerous optical media are known for presenting such properties. There may be mentioned for example as gaseous medium, sodium vapor and in general any gas where there occurs saturated absorption of the radiation. Liquid media may also be used, such as carbon sulfide. As solid media, photorefractive materials may be mentioned such as B.S.O. and $B_aT_iO_3$, but semiconductor materials are also appropriate ($I_nS_b$, $H_gC_dT_e$).

Figure 2:
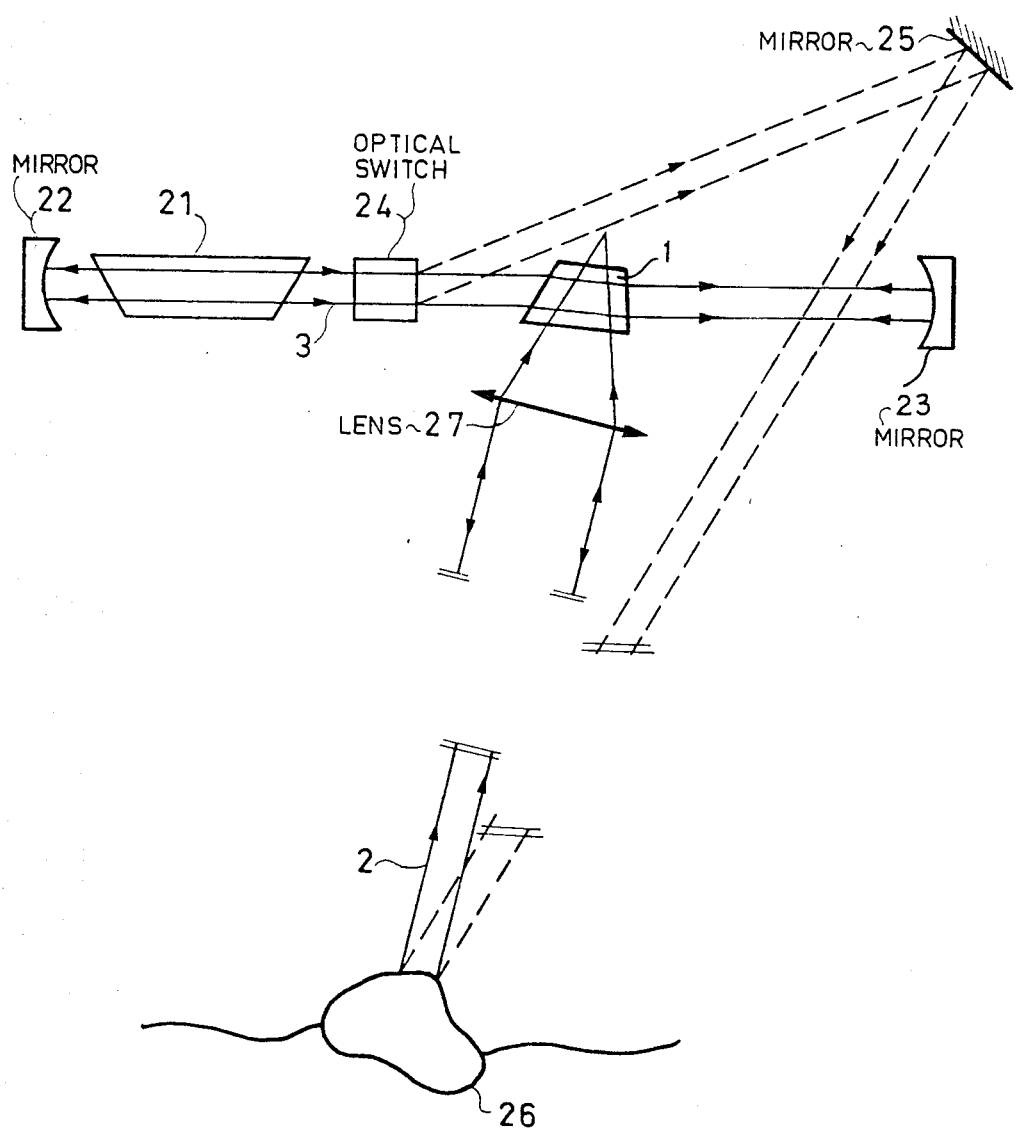
FIG. 2 is a diagram of the illumination device of the invention.

The illumination device of the invention uses such a medium, it is shown schematically in FIG. 2.

Such a device provides in two phases efficient illumination of an object. In an initial phase, radiation of short duration is emitted by a source and directed towards the object to be illuminated so that it reflects back to this source a wave front whose shape depends on the reflecting structure of the object and the passage thereof through the unhomogeneous atmospheric media which separate the object therefrom. This not very efficient pre-illumination gives rise in a subsequent phase to new radiation emissions which take into account the wave front distortion met during the first energy return. Thus the post illumination will be efficiently concentrated on the object which will be better and better illuminated. With the source illustrated in FIG. 2, the evolutive illumination which has just been described may be obtained.

In a laser cavity comprising a laser material properly speaking 21, and closed by two mirrors 22 and 23, is disposed a photoexcitable interaction medium such as has just been described. This medium is disposed so that there passes therethrough the intra-cavity laser radiation which is propagated between the two mirrors 22 and 23.

The two mirrors 22 and 23 are both mirrors having a high reflection coefficient, the closest possible, technologically speaking, to total reflection, so that, contrary to the operation of a conventional laser, no radiation leaves the cavity by partial transmission through one of the mirrors.

To avoid parasitic reflection of the intra-cavity laser radiation on the faces of the interaction medium 1, it is advantageous to dispose it so that the intra-cavity radiation reaches it according to Brewster's incidence which leads, for example, to an arrangement such as the one shown in FIG. 2. This medium 1 is further equipped with a lens 27 for collecting the signal wave and reflecting the conjugate wave back to the object.

The device of the invention may be equipped with means for obtaining the transitory signal wave emitted by object 26 which it is desired to illuminate in a prolonged way. These means, shown in FIG. 2, comprises an electro-optical or acousto-optical switch 24 and a mirror 25.

Switch 24 is disposed in the path of the intra-cavity radiation, for example between mirror 22 and medium 1. In normal operation, it lets the intra-cavity radiation pass towards the interaction medium 1. But it is arranged to send, for a short time, the laser radiation to mirror 25 which reflects it towards object 26.

The operation of this illumination device is the following: initially switch 24 sends a light pulse to mirror 25 to illuminate transitorily object 26. This object reflects back to the device a part of the radiation received, which forms the transitory signal wave which initiates the procedure for prolonged illumination of the object. Switch 24 is then put back into its normal state which lets the intra-cavity radiation pass toward medium 1 and mirror 23.

The transitory signal wave emanating from object 26 and collected by lens 27 interferes, in the volume of the interaction medium 1, with the intra-cavity radiation, thus creating an interference fringe grating. This fringe grating induces an index strata grating which diffracts a part of the intra-cavity radiation from mirror 23 into a conjugate wave of the signal wave. By suitably choosing the operating parameters of the interaction medium 1, the fraction thus diffracted of the intra-cavity radiation is equivalent to the radiation fraction emitted by the usual output mirror of a laser, which has a reflection coefficient of 95%.

The conjugate wave of the signal wave returns to object 26 and undergoes in the reverse direction the same modifications so it is automatically focussed on the object, whatever the disturbances in the atmosphere through which it passes.

The object reflects it back to the device where it again interferes with the intra-cavity radiation. A new conjugate wave is emitted by the medium and the procedure continues. At all times, the diffraction grating written in the medium corresponds exactly to the wave coming from the object, i.e. this grating is permanently modified as a function of the disturbances in the optical object-device path.

Thus, without any mechanical movement of the beam, the device provides illumination of the object, and perfect focussing of the illuminating beam on this object, as long as required, the nominal power of the laser being distributed over the complex wave surface $\Sigma_o$.

Another advantage of the device is the amplification which it is capable of producing on the illuminating wave: if the illumination-index interaction in the photoexcitable medium is efficient, the intensity of the conjugate wave front is greater than the intensity of the incident wave front, the additional energy being taken from the intracavity radiation.

An operating condition is obviously that the time for writing the diffraction grating in the material forming the medium 1 should remain very short in comparison with the fluctuations in time of the phase of the incident signal introduced by disturbances in the optical path of this signal.

This device operates in any wavelength range, provided that the medium 1 is adapted, in transparency, to the wavelength of the laser source used. It can more especially be used in the infrared range, which is advantageous for long travel paths through the air.

This illumination device may be integrated in object detection, target tracking and telemetering systems.

What is claimed is:

1. A device for evolutive illumination of an object by laser radiation comprising:
   an illumination laser whose cavity is closed by two totally refractive mirrors,
   a photoexcitable interaction medium with index variation disposed inside the said cavity in the path of the intra-cavity radiation, and
   means for transitorily illuminating the object by said laser radiation so that the object reflects a transitory signal wave towards said medium, said intra-cavity radiation interfering within said medium with said transitory signal wave so that the interaction medium generates a complex conjugate signal wave reflected towards said object, said conjugate wave returning to the object and being reflected thereby forming a new signal wave having a front whose complex shape depends on the reflecting structure of the object and on the unhomogeneous distribution of the refractive index in the transmission medium separating said laser from said object to provide consecutively evolutive and then maintained illumination of said object from said transitory signal wave, the illumination continuing whatever the disturbance in the transmission medium or motion of the object.

2. The illumination device as claimed in claim 1 wherein said means for transitorily illuminating the object comprise a deviator within said laser cavity and a third mirror, said deviator taking a light pulse from the intra-cavity radiation and sending it to said third mirror which reflects it to illuminate the object.

3. The illumination device as claimed in any one of claims 1 or 2, wherein said photoexcitable interaction medium is disposed in the path of the intra-cavity radiation in accordance with Brewster's incidence.

4. The illumination device as claimed in claim 1, wherein said photoexcitable interaction medium is a photorefractive material.

5. The illumination device as claimed in claim 1, wherein said photoexcitable interaction medium is a semiconductor material.

6. The illumination device as claimed in claim 1, wherein said photoexcitable interaction medium is a gas allowing saturated absorption of said radiation.

7. The illumination device as claimed in claim 4, wherein said photorefractive material is one of the materials from the group: B.S.O., $B_aT_iO_3$, carbon sulfide.

8. The illumination device as claimed in claim 5, wherein said semiconductor material is one of the materials from the group: $G_e$, $I_nS_b$, $H_gC_dT_e$.

9. The illumination device as claimed in claim 6, wherein said gas is sodium vapor.

10. The illumination device as claimed in any one of claims 1 or 2, wherein said radiation is infrared radiation.

* * * * *